United States Patent
Seeberger et al.

(10) Patent No.: US 11,796,988 B2
(45) Date of Patent: Oct. 24, 2023

(54) METHOD AND CONTROL UNIT FOR PROVIDING TRANSPORT DATA FOR CONTROLLING A GOODS TRANSPORT IN A PRODUCTION ENVIRONMENT, AND PRODUCTION ENVIRONMENT

(71) Applicant: Siemens Aktiengesellschaft, Munich (DE)

(72) Inventors: Sebastian Seeberger, Mühlhausen (DE); Verena Hack, Höchstadt (DE); Ulrich Steimann, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/021,118

(22) PCT Filed: Aug. 5, 2021

(86) PCT No.: PCT/EP2021/071916
§ 371 (c)(1),
(2) Date: Feb. 13, 2023

(87) PCT Pub. No.: WO2022/037962
PCT Pub. Date: Feb. 24, 2022

(65) Prior Publication Data
US 2023/0244217 A1 Aug. 3, 2023

(30) Foreign Application Priority Data
Aug. 19, 2020 (EP) .................................... 20191720

(51) Int. Cl.
*G05B 19/418* (2006.01)
*G06Q 10/04* (2023.01)
*G06Q 10/087* (2023.01)

(52) U.S. Cl.
CPC ....... *G05B 19/41865* (2013.01); *G06Q 10/04* (2013.01); *G06Q 10/087* (2013.01); *G05B 2219/39147* (2013.01)

(58) Field of Classification Search
CPC .... G05B 19/41865; G05B 2219/39147; G06Q 10/04; G06Q 10/087
See application file for complete search history.

(56) References Cited

U.S. PATENT DOCUMENTS

| 6,341,266 B1 | 1/2002 | Braun |
| 2018/0004195 A1 | 1/2018 | Finke |

FOREIGN PATENT DOCUMENTS

| DE | 10 2010 032 876 A1 | 2/2012 |
| DE | 20 2017 106 761 U1 | 2/2019 |

(Continued)

OTHER PUBLICATIONS

PCT International Search Report and Written Opinion of International Searching Authority dated Nov. 30, 2021 corresponding to PCT International Application No. PCT/EP2021/071916 filed Aug. 5, 2021.

*Primary Examiner* — Tejal Gami
(74) *Attorney, Agent, or Firm* — Henry M. Feiereisen LLC

(57) ABSTRACT

A method for providing transport data for controlling goods transport in a production environment includes determining occupancy data based on sensor data of a sensor unit on a production unit in the production environment. The occupancy data relate to an occupancy state of a goods inlet of a production unit with stored components. Component data that indicate which components are required at the production unit for a production order assigned to the production unit are determined, as well as procurement data for the required components that indicate an expected transit time for transporting a component from a relevant storage loca- (Continued)

tion to the production unit. Further, transport data that describe a transport process to be performed and that depend on the occupancy data, the component data and the procurement data are determined.

14 Claims, 4 Drawing Sheets

(56) References Cited

FOREIGN PATENT DOCUMENTS

| | | |
|---|---|---|
| DE | 10 2018 007 943 A1 | 4/2020 |
| WO | WO 1999-067729 A1 | 12/1999 |
| WO | WO 2016-082883 A1 | 6/2016 |

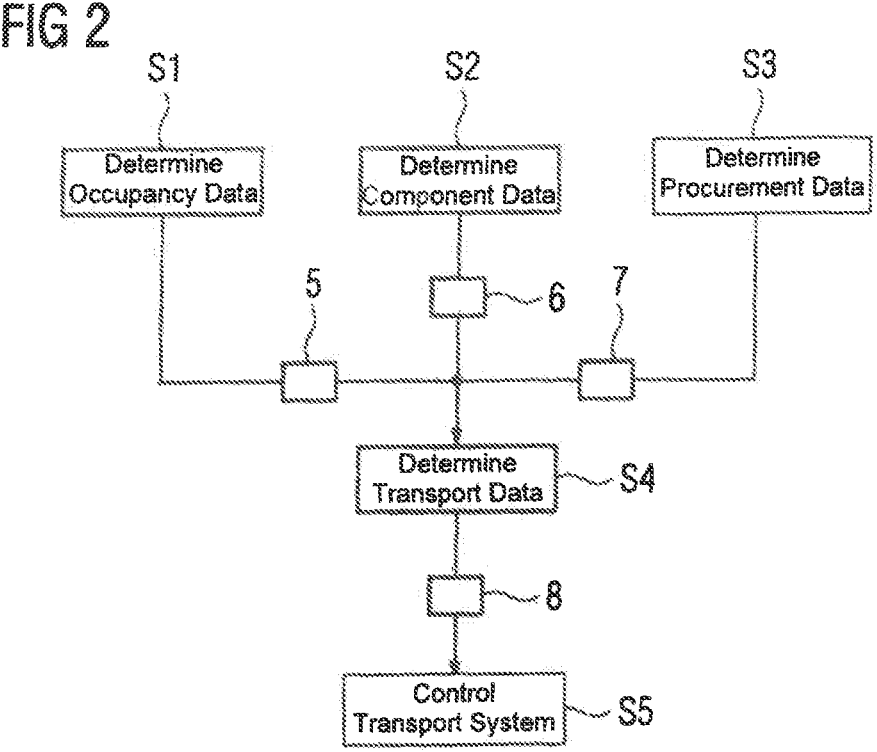
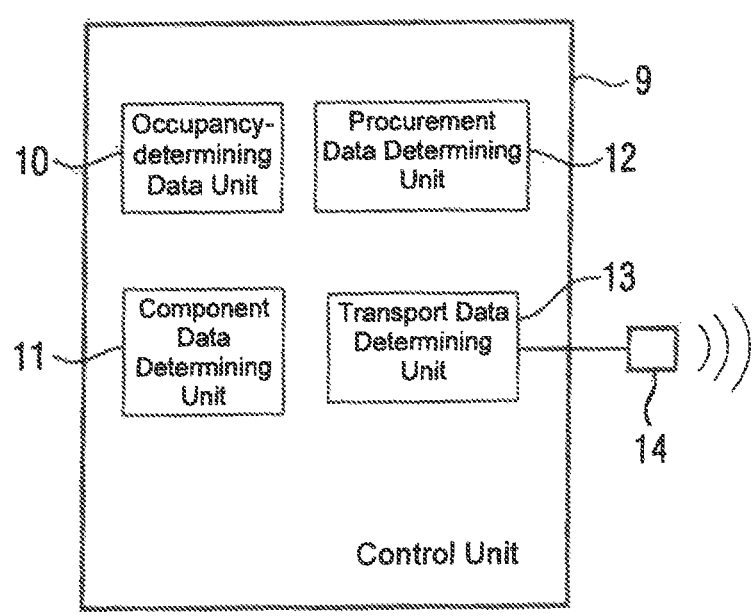

METHOD AND CONTROL UNIT FOR PROVIDING TRANSPORT DATA FOR CONTROLLING A GOODS TRANSPORT IN A PRODUCTION ENVIRONMENT, AND PRODUCTION ENVIRONMENT

CROSS-REFERENCES TO RELATED APPLICATIONS

This application is the U.S. National Stage of International Application No. PCT/EP2021/071916, filed Aug. 5, 2021, which designated the United States and has been published as International Publication No. WO 2022/037962 A1 and which claims the priority of European Patent Application, Serial No. 20191720.0, filed Aug. 19, 2020, pursuant to 35 U.S.C. 119(a)-(d).

BACKGROUND OF THE INVENTION

The invention relates to a method for providing transport data for controlling goods transport in a production environment. A second aspect of the invention relates to a control unit for providing such transport data. Further aspects of the present application relate to a production environment with such a control unit and to a computer program and a storage medium for performing a method.

Present-day inventory management in warehouse management systems in the context of production environments, which can have production units or production islands and/or storage locations for storing components for subsequent further processing in the production units or production islands, can result in serious deviations between real and assumed stocks of components. Such deviations can in particular occur on site at the production unit or production island. On the one hand, this can result in an excess inventory of components and, on the other, in idle time at the respective production island due to the lack of components. In addition, the exact location of raw or semi-finished products is not known. Current supply algorithms in such a management system are rigid and not self-regulating. This leads to a high maintenance outlay and high complexity in an operation. In addition, flexible automation of logistics in the sense of Industry 4.0 is not possible.

It is an object of the present invention, to enable more flexible and/or reliable logistics in a production environment.

SUMMARY OF THE INVENTION

This object is achieved according to the invention by the subject matter of the independent claims. Advantageous embodiments with expedient developments are the subject matter of the subclaims.

A first aspect of the present invention relates to a method for providing transport data for controlling goods transport in a production environment with the following steps:
  determining occupancy data on the basis of sensor data of a sensor unit at the production unit, wherein the occupancy data relates to an occupancy status of at least one goods inlet of a production unit in the production environment with respective stored components,
  determining component data, wherein the component data indicates which components are required at the production unit for a production order assigned to said production unit,
  determining procurement data for the components to be installed, wherein the procurement data indicates how long transport of a respective one of the components to be installed from a respective storage location to the production unit is expected to take,
  determining transport data depending on the occupancy data, the component data and the procurement data, wherein the transport data describes a transport process to be carried out.

The aforementioned data (the occupancy data, the component data and the procurement data) means it is known overall what the occupancy status of the respective production unit is, which components are required at which times at this production unit and how long their transport takes. This (input) data can be used as the basis for determining the transport data, for example by means of a conventional optimization algorithm (or function based on such an optimization algorithm, in particular a machine-executable function), which receives the occupancy data, the component data and the procurement data as input data and outputs the transport data.

The production environment can be an area, for example a factory, in which at least one production unit, but preferably a plurality of production units, are arranged. The production unit or production units can also be referred to as a production island. In particular it is provided that the production units or the production unit enables one or more production steps in the manufacture of the product or is configured to perform the one or more production steps. For example, it can be provided that the product passes through different production units one after the other, wherein different production steps are performed in sequence at the different production units in order to manufacture the product. In other words, in this example, the production units can be embodied to manufacture or finish the product via a plurality of intermediate steps or intermediate products or raw or semi-finished products. Alternatively or additionally, it can be provided that a plurality of production units are configured to perform the same production step or steps. This can, for example, be useful if individual production steps are particularly time-consuming compared to other production steps. This enables a delay in production to be avoided overall in that these particularly time-consuming production steps are performed in parallel by a plurality of production units. In particular, each production unit has a machine or facility embodied to perform a production step assigned to the production unit.

The occupancy data can, for example, be derived from the sensor data, wherein the sensor data can relate to the occupancy status of the at least one goods inlet of the production unit. For example, in an additional method step, which is in particular performed before the determination of the occupancy data, the sensor data can be received from the sensor unit. In another method step, which is likewise optional, the sensor data can be captured by means of the sensor unit. In particular, the sensor unit is arranged at the production unit. The sensor unit can in particular have a plurality of sensors.

The goods inlet can be embodied as a so-called goods channel. In particular, it is provided that the goods inlet has a plurality of goods inlet locations. Each of the goods inlet locations can be embodied to receive a predetermined number of stored components in each case. It is preferably provided that each of the goods inlet locations is embodied to receive or store exactly one transport container for components. Each of the goods inlet locations can have a respective sensor of the sensor unit. This enables the sensor data to indicate which of the goods inlet locations are provided with stored components or a respective transport container. In other words, the sensor data can indicate or characterize the occupancy status of each of the goods inlet locations. Preferably, the production unit has a plurality of goods inlets or goods channels. Herein, it is in particular provided that each of the goods inlets in an operation is equipped with different components. In particular, it can be provided that only the same components are stored or received at a respective goods inlet. The components required at the production unit can be distributed among a plurality of goods inlets such that each goods inlet only contains the same components. This is in particular useful if the same product or intermediate product or raw or semi-finished product is manufactured from the components at the production unit several times in succession. Alternatively, it can be provided that, in sequential operation of the production unit, i.e., when different products or intermediate products or raw or semi-finished products are manufactured one after the other, different components are temporarily stored in a respective goods inlet.

The component data can indicate which components are required at the production unit in order to execute the production order assigned to the production unit. Herein, the production order can contain one or more production steps that the production unit is embodied or configured to perform. In the one or more production steps specified by the production order, a product or intermediate product can be manufactured or finished with the aid of the components. Herein, one or more of the underlying components can likewise be an intermediate product or a raw or semi-finished product. Other examples of components can, for example, be screws, adhesives or any other auxiliaries of this kind. The component data can, for example, be retrieved from a product database, wherein in this case, the respective production steps and components required for this purpose for the product to be manufactured can be stored in the product database. For example, the required components can be stored as part of the production order in an order memory of the production unit. This order memory can in particular be embodied to store the production order.

The procurement data indicates how long transport of a respective one of the components to be installed from a respective storage location to the production unit is expected to take. In other words, it can be determined as part of the procurement data how long it is expected to take to transport a respective component, in particular the components which are required at the production unit in accordance with the component data, from the respective storage location of the respective component to the production unit. The procurement data or the duration of the transport can, for example, be determined depending on user input containing, for example, a value for the duration of the transport on the basis of a distance between the production unit and the storage location and/or on the basis of a history of past transport processes between the respective storage location and the production unit.

The transport data is now determined depending on the occupancy data, the component data and the procurement data. In other words, the transport data can describe or define the transport to be performed in dependence on the occupancy data, the component data and/or the procurement data. In other words, transport to be performed of one or more components can be determined in dependence on the occupancy status of the at least one goods inlet of the production unit, the components required for a respective production order and the expected duration of the transport. This enables highly flexible planning of the transport to be performed based on the transport data. Moreover, the occupancy status of the at least one goods inlet or the components stored at the goods inlet is preferably always known on the basis of the occupancy data. This enables deviations between real and fictitious stocks of components to be avoided.

According to one development, it is provided in an additional method step that the transport data is transmitted to a transport system, in particular to a plurality of driverless transport vehicles. For example, the transport data is transmitted to the transport system, in particular to the plurality of driverless transport vehicles via a wired or wireless connection. Such a wireless connection can in particular be implemented via a cellular network, via Bluetooth, via WLAN or WiFi or any other radio link. The transmission of the transport data enables the transport system, in particular the plurality of driverless transport vehicles, to be controlled. In particular, transport of components, which takes place by the transport system, in particular the plurality of driverless transport vehicles, is controlled by means of the transport data. In other words, transport of the components to be installed from the respective storage location to the production unit or the at least one goods inlet by the transport system, in particular the plurality of driverless transport vehicles, can be specified or commanded in accordance with the transport data. Optionally, the transport of the components to be installed by the transport system, in particular the plurality of driverless transport vehicles, according to the transport data can be understood to be part of the claimed method. In this case, the method can alternatively be referred to as a method for controlling goods transport in a production environment. In other words, the present invention also refers to such a method for controlling goods transport or for transporting components in a production environment.

According to one development, it is provided that a production cycle is determined depending on the production order assigned to the production unit and the transport data is additionally determined depending on this production cycle. The production cycle can indicate how long the production unit is expected to take, or requires on average, to process the assigned production order. In particular, the production cycle can indicate a periodicity with which production steps specified by the production order are performed on an intermediate product or raw or semi-finished product. For example, the production cycle indicates how long it takes to manufacture an intermediate product or semi-finished product at the production unit according to the production order. Hence, the production cycle can indicate a duration of a period with which the manufacture of intermediate products or semi-finished products takes place at the production unit according to the production order. This enables the transport data to be additionally determined depending on the duration of the respective execution of the production order. This enables it to be ensured in dependence on the production cycle that there are always enough components available at the production unit without it being necessary for production to be paused by the production unit due to a lack of components.

According to one development, it is provided that a remaining runtime of components stored at the production unit is determined in dependence on the production cycle, the component data and the occupancy data, wherein the transport to be performed is commanded in accordance with the transport data at a time at which the remaining runtime is greater than a time period determined by the production cycle. In other words, the remaining runtime can indicate how long the components stored at the production unit or in the at least one goods inlet of the production unit will be sufficient for the performance of the production order taking into account the production cycle and the component data. This can be performed for all types of components independently of one another. For example, it is determined for all different types of components how many production cycles are still possible with the stored components in accordance with a consumption per production cycle specified by the component data. Multiplied by the time period determined by the production cycle, this can produce the remaining runtime. The time period determined by the production cycle is in particular the duration of a period or duration per manufactured intermediate product or semi-finished product on which the production cycle is based. The fact that the transport is commanded or defined by the transport data at a time at which the remaining runtime is greater than the time period determined by the production cycle ensures that there are always sufficient components available or stored at the production unit to maintain production or to perform the production order.

According to one development, it is provided that the respective storage locations and/or the production unit are in each case assigned unique coordinates in relation to a coordinate system of the production environment. In a further embodiment, it can be provided that a respective unique coordinate is assigned to each goods inlet or each goods channel of the production unit. Said coordinates can in each case be assigned in accordance with user input. This enables each of the storage locations and/or each production unit and/or each goods inlet in each case to be provided with a unique coordinate which can characterize the production environment as a whole. In particular in the event of a modification of the production environment, renewed adaptation to the modified production environment is facilitated by the fact that in each case only the coordinates have to be updated. The unique coordinate of a respective goods inlet or goods channel enables each of the goods inlets or goods channels to be addressed individually. This, on the one hand, improves the flexibility and, on the other, the accuracy with which transport processes are enabled.

According to one development, it is provided that the determination of the occupancy data includes determining a number of transport containers located in the at least one goods inlet on the basis of the sensor data and multiplying this number of transport containers by a predetermined value. Herein, the predetermined value can be different for different types or categories of components. In particular, it is provided that a transport container transported to the production unit always contains a number of components corresponding to the predetermined value. If the predetermined value is different for different types of components, the respective transport container contains as many components as the predetermined value specific to the type of component. This enables the number of components to be determined from the number of transport containers. Accordingly, the number of components located in a goods inlet corresponds to the number of transport containers located in the respective goods inlet multiplied by the predetermined value in each case. This means there is no need to count components, since the number of components can always be calculated from the sensor data or occupancy data. This enables a significant simplification of the inventory management.

According to one development, it is provided that a respective content of a transport container located in the at least one goods inlet or on the goods channel is determined on the basis of the coordinate of the respective goods inlet. In other words, a respective type of component or a specific component is assigned to each goods inlet of the production unit. The assigned component or the assigned type of component can then be retrieved on the basis of the coordinate of the respective goods inlet. For example, the components or types of components assigned to the respective goods inlets are stored in a corresponding component database. This means it is not necessary to classify the transport containers. Instead, the content of the corresponding transport container can be inferred solely on the basis of the coordinate of the respective goods inlet in which the transport container is located or to which transport container is en route. This is a significant simplification of the inventory management system.

According to one development, it is provided that the occupancy data and/or the sensor data additionally relate to an occupancy status of at least one goods outlet of the production unit. In other words, an occupancy status of the goods outlet can be determined as part of the sensor data and/or occupancy data. Herein, it can in particular be determined on the basis of the sensor data as part of the occupancy data whether and/or how many goods outlet locations of the goods outlet are occupied or free. This means the occupancy status of the goods outlet is always known. Timely removal of empty transport containers can be ensured based on the occupancy status of the goods outlet. This enables overfilling of the goods outlet to be avoided.

According to one development, it is provided that the determination of the procurement data takes place at least in dependence on a position of the respective storage location and a position of the production unit. In particular, the expected duration required to transport a respective one of the components to be installed from the respective storage location to the production unit can be derived based on the respective position of the storage location and the production unit. In particular, it is possible to determine a relative position between the respective storage location and the production unit. Alternatively or additionally, it is possible to determine a path within the production environment along which said transport can take place. An average speed, for example an averaged value from the past or a predetermined value for the average speed, can then be used to determine the transport duration.

Alternative or additional options for determining the procurement data or the duration of the transport are, for example: deriving the duration from user input or averaging measurements of how long was required for previous transport processes, in particular of the same component.

A second aspect of the present invention relates to a control unit for providing transport data for controlling goods transport in a production environment. The control unit has:
- an occupancy determining data unit embodied to determine occupancy data relating to an occupancy status of at least one goods inlet of a production unit in the production environment with respective stored components on the basis of sensor data of a sensor unit of the production unit,
- a component data determining unit embodied to determine component data, wherein the component data indicates which components are required at the production unit for a production order assigned to the production unit,
- a procurement data determining unit embodied to determine procurement data for the components to be installed, wherein the procurement data indicates how long transport of a respective one of the components to be installed from a respective storage location to the production unit is expected to take, and a transport data determining unit embodied to determine transport data depending on the occupancy data, the component data and the procurement data, wherein the transport data describes a transport process to be carried out.

In particular, the control unit is configured to perform a method according to the invention for providing transport data according to one or more of the embodiments described in the present application. For this reason, all developments and the advantages thereof which are disclosed with respect to the method according to the invention also apply to the control unit according to the invention, even if these are not repeated here for reasons of brevity.

Optionally, the control unit can additionally have an output interface for outputting the transport data. In particular, the output interface is embodied to transmit the transport data to the transport system. For example, the output interface can have a radio module by means of which the output interface is embodied to transmit the transport data to a plurality of driverless transport vehicles.

The control unit can have a data processing apparatus or a processor facility configured to perform an embodiment of the method according to the invention. The processor facility can, for example, have at least one microprocessor and/or at least one microcontroller and/or at least one FPGA (field programmable gate array) and/or at least one DSP (digital signal processor). Furthermore, the processor facility can comprise program code means configured to perform the embodiment of the method according to the invention when executed by the processor facility. The program code means can be stored in a data memory of the processor facility.

A third aspect of the present invention relates to a production environment with the control unit according to the invention and the production unit on which the sensor unit is arranged, wherein the sensor unit is embodied to capture the sensor data relating to the occupancy status of the at least one goods inlet. In other words, the sensor unit is part of the production environment according to the invention. In particular, the production environment according to the invention has a plurality of production units. Herein, each of the production units can have a respective transmitter unit.

In particular, the production environment is configured to perform a method according to the invention for providing transport data according to one or more of the embodiments described in the present application. For this reason, all developments and the advantages thereof which are disclosed with respect to the method according to the invention also apply to the production environment according to the invention, even if these are not repeated here for reasons of brevity.

The invention also includes a computer program, which can be loaded directly into a memory of a control unit according to the invention, with program code means for executing the steps of the method according to the invention when the program is executed in the control unit. The computer program according to the invention implements the method according to the invention on the control unit according to the invention when it is executed in the control unit. Accordingly, the invention also includes a storage medium with electronically readable control information stored thereupon, which comprises at least said computer program and is designed to perform the method according to the invention when the storage medium is used in a control unit according to the invention. The storage medium can, for example, be configured for digital or analog storage of data. The storage medium can be written once or multiple times and be volatile or non-volatile.

The method according to the invention and/or the computer program according to the invention can in each case be provided by the control unit according to the invention, a single computer, a network of a plurality of computers and/or by a server facility or a server. In particular, provision by a cloud is possible.

BRIEF DESCRIPTION OF THE DRAWING

The invention will now be described in more detail with reference to the attached drawings. Herein, features which are shown in the following description of the figures or solely in the figures are also deemed to be developments of the method according to the invention, the control unit according to the invention or the production environment according to the invention. The figures show:

FIG. 2 a flowchart of an exemplary embodiment of a method for providing transport data for controlling goods transport;

FIG. 3 a schematic block diagram of a control unit for performing the method;

DETAILED DESCRIPTION OF PREFERRED EMBODIMENTS

Figure 1:
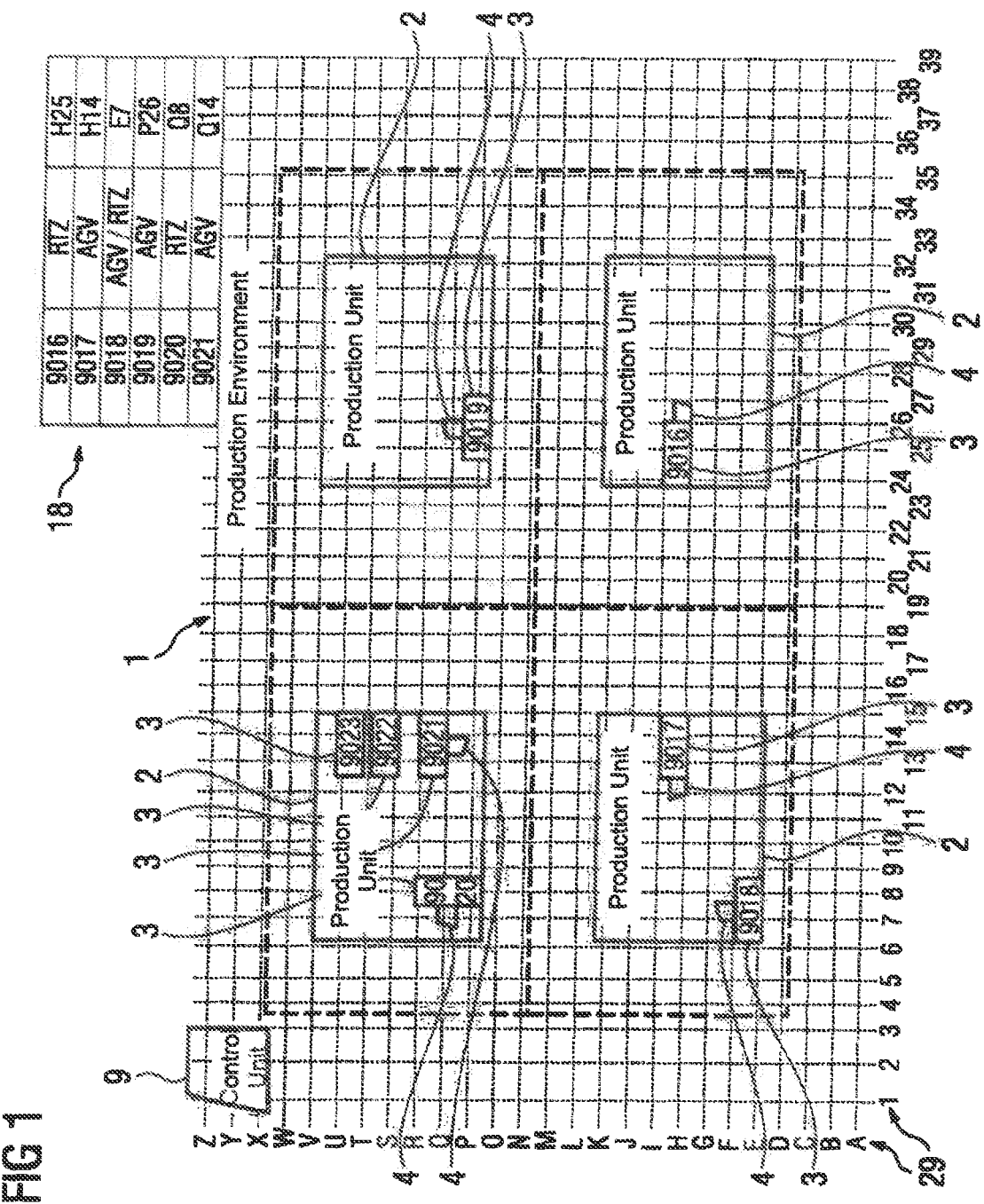
FIG. 1 a schematic top view giving an overview of a production environment with a plurality of production units.

FIG. 1 shows a schematic top view of a production environment 1 with a plurality of production units 2. The production units 2 are configured to perform one or more respective production steps during the manufacture of a product. For example, it can be provided that the product passes through different production units 2 one after the other during manufacture, wherein different production steps are performed in sequence at the different production units 2 in order to manufacture the product. In other words, in this example, the production units 2 can be embodied to manufacture or finish the product via a plurality of intermediate steps or intermediate products or raw or semi-finished products. Alternatively or additionally, it can be provided that a plurality of production units 2 are configured to perform the production step or steps. This can, for example, be useful if individual production steps are particularly time-consuming compared to other production steps. The production units 2 can in each case be referred to as a production island.

In order to ensure the processing of the product, it is, on the one hand, necessary to transport raw components, for example screws or add-ons, and intermediate products or raw or semi-finished products between the production units 2 among each other and between the production units 2 and a warehouse with a plurality of storage locations. For purposes of simplification, the present application always refers to components; this is intended to include all possible types of components, i.e., raw components and intermediate products or raw or semi-finished products. Transport of the components is controlled centrally by a control unit 9. In other words, the control unit 9 is embodied to control the goods transport in the production environment 1 or to provide corresponding transport data for controlling the goods transport.

The production units 2 in each case have at least one goods inlet 3 or goods channel 3 for receiving the components. Herein, each goods inlet 3 or goods channel 3 has a plurality of goods inlet locations, wherein exactly one transport container for components can be stored at each of the goods inlet locations. In addition, each production unit 2 or each goods channel 3 has a respective sensor unit 4. The sensor unit 4 is embodied to provide sensor data relating to the warehouse status of the goods channels 3. In particular the sensor data can indicate which goods channels 3 or which goods inlet locations are occupied. For example, the sensor unit 4 can have a plurality of sensors, wherein a respective sensor is arranged at each of the goods inlet locations. Each of the sensors can contribute to the sensor data as to whether the respective goods inlet location is occupied with a transport container or is free. For this purpose, each of the sensors can, for example, be embodied as a respective pressure sensor, as a light barrier, as a switch that can be triggered by the transport containers or as any other kind of sensor.

Overall, the sensor data can hence indicate which goods channels 3 or which of the goods inlet locations are occupied by transport containers.

FIG. 1 also shows that coordinates 29 are assigned to the production environment 1. Likewise, respective addresses are assigned to the goods channels 3. This enables the goods channels 3 to be uniquely determined with respect to their placement within the production environment 1 by the coordinates 29 and additionally on the basis of their respective address. For example, the goods channel 3 with the address 9020 is located at coordinate Q8 and the goods channel 3 with the address 9021 at coordinate Q14. The respective assignment of the coordinates 29 enables simple planning within the production environment 1. Even if the production environment 1 is changed or the production units 2 are adapted to a changed operation, the changed production environment can be mapped in a simple manner by adapting the coordinates 29. An assignment table 18 can additionally be used to assign a respective type of transport unit (RTZ or AGV) of a transport system and the respective coordinate to the individual goods channels 3.

FIG. 2 is a flowchart of an exemplary embodiment of a method for providing transport data (steps S1 to S4) or a method for controlling goods transport (steps S1 to S5). In a step S1, occupancy data 5 relating to the occupancy status of the goods channels 3 of the production units 2 in the production environment 1 with respective stored components is determined. In other words, the occupancy data indicates how many components are stored in the goods channels 3 of the production units 2.

In the present case, the occupancy data is derived from the sensor data. Specifically, the occupancy data can be derived from the occupancy statuses of goods inlet locations. Herein, each of the goods channels 3 is specifically assigned to exactly one component or one type of component. Additionally, it can be provided that the same number of components is always arranged or transported within a transport container. In other words, a predetermined number of components is always arranged in the respective transport container for transport in a transport container. Herein, the predetermined number can be specific to a certain component or type of component. For example, it can be provided that ten screws of the same type are always transported within a transport container. This enables the number of components in a goods channel 3 to be easily calculated by multiplying the number of transport containers (evident from the sensor data) by the predetermined number for the respective component.

In a step S2, component data 6 is determined, wherein the component data 6 indicates which components are required at the production unit 2 for a production order assigned to the production unit 2. In other words, it is determined in step S2, which components, i.e., for example which raw component and/or intermediate products are required at a respective production unit for further processing in the context of the production order. This can, for example, be retrieved from a corresponding database. For example, the required components can be stored as part of the production order in an order memory of the respective production unit 2. This order memory can in particular be embodied to store the production order. Alternatively or additionally, it can be provided that the required components are retrieved from a product database, wherein in particular a plurality of corresponding data records for different products are stored in the product database. Alternatively or additionally, it is very understandably possible for the required components to be derived from user input. For such user input, the respective production unit 2 can have a corresponding user interface, for example a mouse, keyboard and/or screen.

A production cycle can be determined as part of the component data. Herein, the production cycle can indicate a duration of a period or a frequency with which the production order is performed or is to be performed at the respective production unit 2. The production cycle can, for example, be determined on the basis of the user input and/or on the basis of the product database.

A respective component or a respective type of component can be assigned to the goods channels 3 on the basis of their unique address, for example 9020 or 9021. In other words, it is possible for only similar components or components of the same type to be stored or delivered within a goods channel 3. Herein, the assignment of the components to the goods channel 3 takes place via the unique address of the respective goods channel 3. The corresponding assignment can be stored in a database of the control unit 9.

In a step S3, procurement data 7 for the components to be installed is determined. The procurement data 7 indicates how long it takes to deliver the respective components to one of the production units 2. Herein, the procurement data 7 can indicate this in each case with reference to the unique address of a goods channel 3 assigned to the respective component. In other words, the procurement data 7 can indicate how long transport of the components assigned to a respective goods inlet 3 from a respective storage location in an external warehouse to the corresponding goods channel 3 or the production unit 2 is expected to take. For example, the procurement data 7 indicates the duration of how long it takes to supply the goods inlet with the unique address 9019 with the assigned components from the corresponding storage location at which the assigned components are stored in the external warehouse.

In step S4, transport data 8 is determined. The transport data 8 is used to control the goods transport in the production environment 1. For example, the transport data 8 contains a schedule or a flowchart for transport processes to be performed in the production environment 1. In particular, the transport processes to be performed can be characterized by the unique addresses of the goods channels 3 and/or their coordinates and a time stamp. In other words, the transport data can indicate at which times a transport system in the production environment 1 performs which transport processes from or to which goods channels 3. This takes place based on the occupancy data 5, the component data 6 and the procurement data 7. From said data, it is known overall which components are required at which times at the respective production unit 2 and how long the transport takes. This enables it to be ensured that the transport starts at the correct time in each case so that the corresponding components are supplied before they are used up at the production unit 2. This enables production downtimes or production stops to be reduced.

In an optional step S5, the transport system, which in particular contains a plurality of driverless transport vehicles is controlled in accordance with the transport data 8. In other words, in step S5 the transport of the components is specified in accordance with the transport data 8. In the course of step S5, the transport data 8 can, for example, be transmitted to the transport system, in particular the plurality of driverless transport vehicles. For example, the driverless transport vehicles are controlled in accordance with the flowchart or schedule. Alternatively, it can be provided that the driverless transport vehicles are embodied to transport the components autonomously on the basis of the transport data 8.

FIG. 3 shows the control unit 9 in an extremely schematic block diagram. In the present case, the control unit 9 has an occupancy determining data unit 10 embodied to determine the occupancy data 5. In particular, the occupancy determining data unit 10 is embodied to perform method step S1. In the present case, the control unit 9 has a component data determining unit 11 embodied to determine the component data 6. In particular, the component data determining unit 11 is embodied to perform method step S2. Additionally, in the present case, the control unit 9 has a procurement data determining unit 12 embodied to determine the procurement data 7. In particular, the procurement data determining unit 12 is embodied to perform method step S3. Additionally, in the present case, the control unit 9 has a transport data determining unit 13 which is embodied to determine the transport data 8 depending on the occupancy data 5, the component data 6 and the procurement data 7. In particular, the transport data determining unit 13 is embodied to perform method step S4. In addition, in the present example, the control unit 9 has an output interface 14, wherein, in the present case, by way of example, the output interface 14 has a radio module. The output interface 14 is in particular embodied to transmit the transport data 8 to the transport system, in particular the driverless transport vehicles, and/or to control the transport system, in particular the driverless transport vehicles, on the basis of the transport data 8.

The control unit 9 can have a data processing apparatus or a processor facility. For example, the data processing apparatus and/or the processor facility implements the occupancy determining data unit 10, the component data determining unit 11, the procurement data determining unit 12 and/or the transport data determining unit 13. The processor facility can, for example, have at least one microprocessor and/or at least one microcontroller and/or at least one FPGA (field programmable gate array) and/or at least one DSP (digital signal processor). Furthermore, the processor facility program code means can be configured, when executed by the processor facility, to perform an embodiment of the method for providing transport data and/or for controlling the goods transport in the production environment 1. The program code means can be stored in a data memory of the processor facility.

Figure 4:
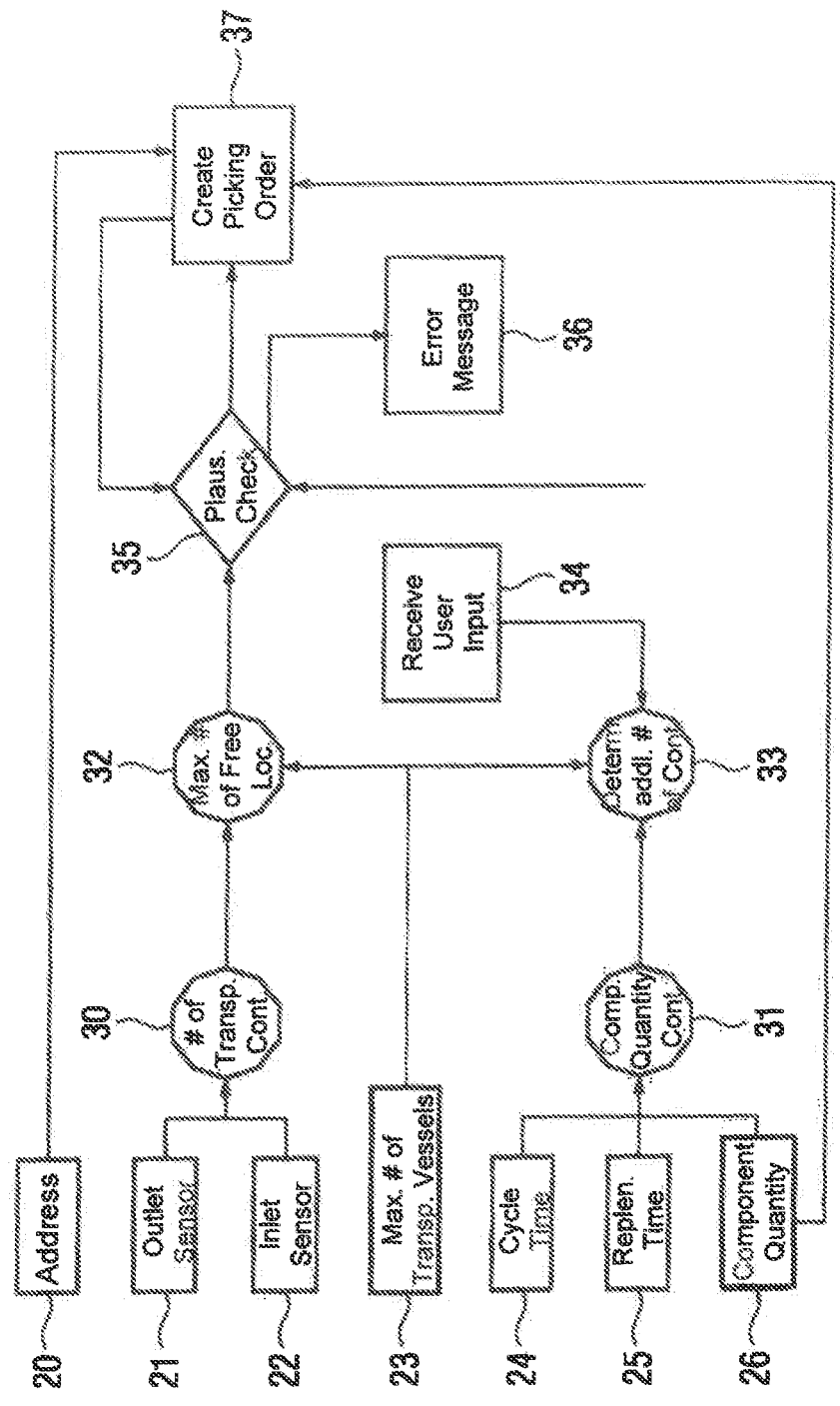
FIG. 4 a flowchart of a second exemplary embodiment of the method.

FIG. 4 shows a further exemplary embodiment of the method. The object of the method is to create a picking order 37. The picking order 37 can correspond to the transport data 8. The input variables used are described in the following:

an address 20 of the target location, in particular the unique address of the corresponding goods channel 3, for example the goods channel 3 with the address 9021;

an outlet sensor 21 and/or an inlet sensor 22 of the sensor unit 4, wherein outlet sensors 21 are arranged at goods channels 3 used as an outlet and inlet sensors 22 are arranged at goods channels 3 used as a goods inlet; as described above, the outlet sensors 21 and inlet sensors 22 in each case contribute to the sensor data of the sensor unit 4;

the maximum size 23 or maximum number of transport vessels, which can be arranged in a respective goods channel 3;

the production cycle or cycle time 24, which specifies the duration of a period or frequency of production of an intermediate product;

the replenishment time 26, which in particular corresponds to the duration of the transport, which is part of the procurement data 7;

the component quantity 26 in a transport container, which in particular corresponds to the afore-mentioned predetermined value of components per transport container, wherein the component quantity 26 per transport container is in particular specific and constant for each component or each type of component.

In a step 30, a current number of transport containers in a respective goods channel 3 is determined. This takes place on the basis of the sensor data or the data from outlet sensors 21 and/or inlet sensors 22. Additionally, in a step 32, a maximum number 32 of transport containers and/or a number 32 of free locations for transport containers in the respective goods channel 3 is determined. In particular, the number 32 of free locations indicates how many free goods inlet locations for transport containers a respective goods channel 3 still has. Hence, the number 32 corresponds to the maximum number of transport containers that a respective goods channel 3 can currently accommodate in addition to the existing transport containers.

In a step 31, the component quantity per transport container 26 or the predetermined value, the replenishment time 25 or the procurement data 7 and the production cycle or the cycle time 24 are used as the basis for determining a number of required transport containers with respect to the production order of the respective production unit 2. In particular, this takes place in parallel for all different required component types. In a step 33, this is compared with the current number determined in step 30. As the result of step 33, it is determined how many transport means containers with components are required in addition to the transport containers present at the production unit 2 or in the goods channel 3 and have to be transported from the warehouse to the goods channel 3 or to the production unit 2. This can be referred to as the number of transport containers to be transported. In an optional step 34, user input can be received. The number of transport containers to be transported can be adapted to a change in demand depending on the user input.

In a step 35, a plausibility check is performed. In the course of this plausibility check, it can, for example, be checked whether the respective goods channel 3 is capable of accommodating the number of transport containers to be transported. In the event of an error or the event of a lack of plausibility, an error message 36 can be output. Otherwise, the picking order 37 is created based on the number of transport containers to be transported and the address of the target location, i.e., for example the address of the goods channel 9021.

Figure 5:
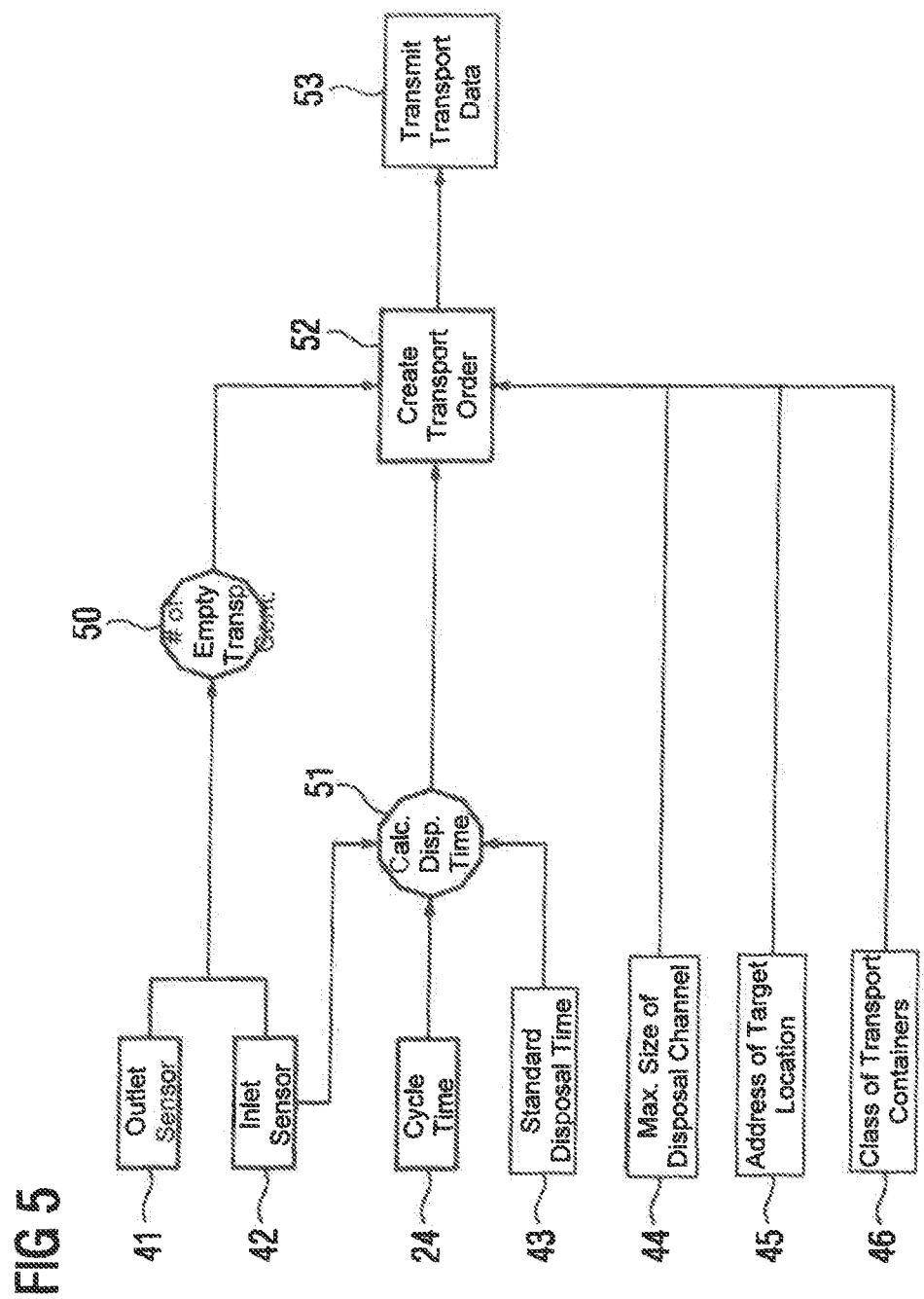
FIG. 5 a flowchart of a third exemplary embodiment of the method.

Finally, FIG. 5 shows an intelligent removal of empty transport containers from the production units 2 or the goods channels 3 thereof. The input variables are again described briefly here:

- an outlet sensor 41 and/or an inlet sensor 42 of the sensor unit 4, wherein the sensor data relates to the number of empty transport containers in a respective goods channel 3 or at a respective production unit 2;
- the production cycle or the cycle time 24;
- a standard disposal time 43, which is in particular a specified average value for the disposal or removal of empty transport containers;
- a maximum size 44 of a disposal channel;
- an address 45 of the target location, in particular a unique address for the disposal of the empty transport containers, preferably a unique address related to the coordinates 19 of the production environment 1; and
- a class 46 of the transport container to be disposed of in each case, for example, this can be a box or a pallet.

In a step 50, a number of empty transport containers in a respective goods channel 3 is calculated, in particular based on the sensor data from an outlet sensor 41 and/or an inlet sensor 42. In a step 51, a disposal time is dynamically calculated based on the standard disposal time 43, the cycle time 24 and the inlet sensor 42. In a step 52, a transport order for the removal of the empty transport containers can be created from the number of empty transport containers and the dynamic disposal time. This transport order can in particular be part of the transport data 8. In other words, the transport order for the removal of the empty transport containers contributes to the transport data 8. This, for example, enables removal of the empty transport containers to be integrated into the schedule or flowchart for the transport data 8. This enables targeted transport of both components and empty transport containers by means of the common transport data 8. In a step 53, this can be transmitted to the transport system.

What is claimed is:

1. A method for providing transport data for controlling goods transport in a production environment, said method comprising:
   based on sensor data of a sensor unit disposed at a production unit in the production environment, determining occupancy data relating to an occupancy status of at least one goods inlet of the production unit having stored components;
   determining component data that indicate which components are required at the production unit for a production order assigned to the production unit;
   determining procurement data for components to be installed at least in dependence on a position of a respective storage location and a position of the production unit, with the procurement data indicating how long it is expected to take to transport a respective one of the components to be installed according to the component data from the respective storage location to the production unit;
   determining transport data with an optimization algorithm that receives as input data the occupancy data, the component data and the procurement data and outputs the transport data, with the transport data describing a transport process to be carried out; and
   transmitting the transport data to a transport system for controlling transport of the components based on the transport data.

2. The method of claim 1, further comprising transmitting the transport data to driverless transport vehicles.

3. The method of claim 1, further comprising:
   determining a production cycle depending on the production order, and
   additionally determining the transport data depending on the production cycle.

4. The method of claim 3, further comprising:
   determining in dependence on the production cycle, the component data and the occupancy data a remaining runtime of the components stored at the production unit, and
   commanding the transport to be performed in accordance with the transport data at a time when the remaining runtime is greater than a time period defined by the production cycle.

5. The method of claim 1, further comprising assigning to the storage locations or the production unit unique coordinates with respect to a coordinate system of the production environment.

6. The method of claim 1, wherein determining the occupancy data comprises determining based on the sensor data a number of transport containers located in the at least one goods inlet and multiplying this number of transport containers by a predetermined value.

7. The method of claim 6, further comprising determining a content of a transport container located in the at least one goods inlet or on a transport route to the at least one goods inlet based on a unique coordinate of the at least one goods inlet.

8. The method of claim 1, wherein the occupancy data or the sensor data additionally relate to an occupancy status of at least one goods outlet of the production unit.

9. A control unit for providing transport data for controlling goods transport in a production environment, said control unit comprising:
   an occupancy determining data unit configured to determine, based on sensor data of a sensor unit disposed at a production unit in the production environment, occupancy data relating to an occupancy status of at least one goods inlet of a production unit in the production environment having stored components;
   a component data determining unit configured to determine component data that indicate which components are required at the production unit for a production order assigned to the production unit;
   a procurement data determining unit configured to determine procurement data for components to be installed at least in dependence on a position of a respective storage location and a position of the production unit, with the procurement data indicating how long it is expected to take to transport a respective one of the components to be installed according to the component data from the respective storage location to the production unit;
   a transport data determining unit configured to determine transport data describing a transport process to be carried out, using a optimization algorithm that receives the occupancy data, the component data and the procurement data as input data and outputs the transport data; and an output interface configured to output the transport data and transmit the transport data to a transport system for controlling transport of the components based on the transport data.

10. A production environment, comprising:
the control unit as set forth in claim 9, and
the production unit with the sensor unit, with the sensor unit configured to capture the sensor data relating to the occupancy status of the at least one goods inlet.

11. A computer program having program code embodied on a computer-readable non-transitory medium, with the program code when loaded into a memory of a control unit that provides transport data for controlling goods transport in a production environment and executed by a processor in the control unit causing the control unit to execute a method as set forth in claim 1.

12. A computer-readable non-transitory storage medium comprising a computer program having computer-readable program code, with the program code when loaded into a memory of a control unit that provides transport data for controlling goods transport in a production environment and executed by a processor in the control unit causes the control unit to execute a method as set forth in claim 1.

13. A method for controlling goods transport in a production environment, said method comprising controlling with a transport system the goods transport commensurate with transport data provided to the transport system according to a method set forth in claim 1.

14. A method for transporting components in a production environment, said method comprising transporting the components with a transport system commensurate with the transport data provided to the transport system according to a method set forth in claim 1.

* * * * *